Figure 1:
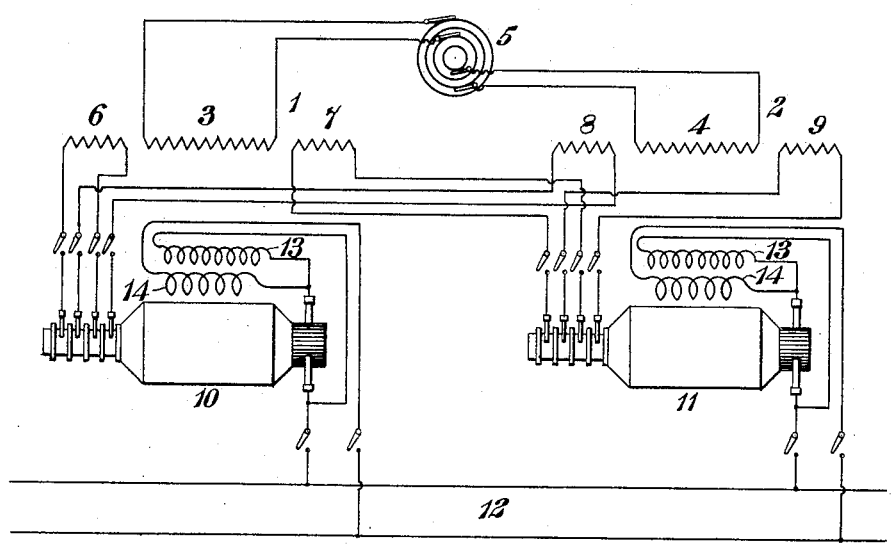

No. 751,549. PATENTED FEB. 9, 1904.
J. S. PECK.
SYSTEM OF ELECTRICAL DISTRIBUTION.
APPLICATION FILED MAY 1, 1903.
NO MODEL.

WITNESSES:
C. L. Belcher
O. S. Schairer

INVENTOR
John S. Peck
BY
Wiley G. Carr
ATTORNEY.

No. 751,549. Patented February 9, 1904.

UNITED STATES PATENT OFFICE.

JOHN S. PECK, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

SPECIFICATION forming part of Letters Patent No. 751,549, dated February 9, 1904.

Application filed May 1, 1903. Serial No. 155,237. (No model.)

*To all whom it may concern:*

Be it known that I, JOHN S. PECK, a citizen of the United States, and a resident of Pittsburg, in the county of Allegheny and State of Pennsylvania, have invented a new and useful Improvement in Systems of Electrical Distribution, of which the following is a specification.

My invention relates to systems of electrical distribution, and particularly to such systems as effect the conversion of alternating currents into direct currents by means of rotary converters.

The object of my invention is to so construct transformers for supplying rotary converters that the voltage variation of the direct-current circuit supplied by such converters may be substantially unaffected by a variation in the number of converters supplied from a given bank of transformers or so that predetermined different degrees of voltage variation may be provided by definite variations in the numbers of rotary converters employed.

In the operation of rotary converters it is frequently desirable to insert into the alternating-current circuits which supply such converters a certain amount of inductance in order to provide for voltage adjustment in the direct-current circuit to conform to changes in load. This inductance may be provided either by means of choke-coils inserted for the specific purpose stated, or it may be provided by special construction and arrangement of the transformers which supply the converters. The inductance in the supply-circuit may be utilized to vary the voltage in the direct-current circuit either by varying the shunt field-current of the rotary converter or in the case of a compound-wound converter by means of the series winding, which acts automatically, the amount of variation of voltage obtained by means of a given rotary converter having a definite number of turns in its series field-magnet winding being dependent upon the amount of inductance in the alternating-current circuit, this operation and result being set forth in a patent granted to R. D. Mershon, November 24, 1896, No. 571,863.

In case two or more rotary converters are operated from a single bank of transformers with their direct-current ends connected in parallel it is desirable to provide the transformers with two or more independent secondary windings in order that the rotary converter shall not be connected to the same busbars on the alternating-current side.

In the usual arrangement of transformer-coils with two or more separate secondary windings the inductive volts are proportional to the load regardless of the number of circuits which may be employed, so that full load upon one rotary converter connected to one of the circuits will produce only one-half the inductive effect which is produced by full load on two rotary converters supplied from the two circuits or only one-third of that produced by three rotary converters supplied from three circuits, &c.

Since the compounding effect in a rotary converter having series field-magnet coils is proportional to the inductive volts in the alternating-current circuit, the compounding effect with one rotary converter connected in circuit will obviously be but one-half that of two rotary converters connected in circuit and one-third that with three rotary converters connected in circuit, &c.

In certain cases it is desirable to provide the same compounding effect when only one rotary converter is in operation that is provided when two or more are in operation, and I propose to effect such a result by means of my present invention illustrated in the accompanying drawings, in which—

Figure 2:
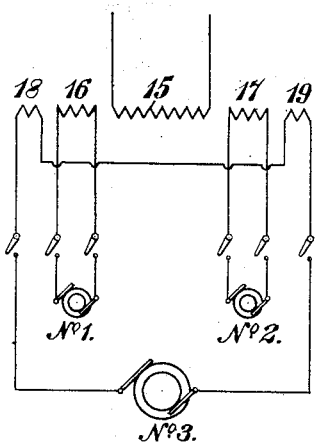
Figure 3:
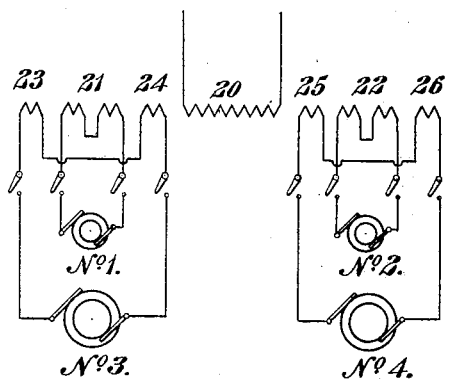

Figure 1 is a diagram of a system in which two rotary converters are operated from a bank of two transformers. Fig. 2 is a diagram of one transformer constructed for use as one of a bank of transformers for supplying three rotary converters in the manner indicated in Fig. 1. Fig. 3 is a diagram of a single transformer constructed for use in a bank of like transformers for supplying four rotary converters in the manner indicated in Fig. 1.

Referring now to Fig. 1, I have shown two transformers 1 and 2, the primary windings 3 and 4 of which are supplied from a suitable two-phase generator 5. The transformer 1 has its secondary winding divided into two parts 6 and 7, which are placed at the two sides of the primary winding 3, and in the same manner the transformer 2 has its secondary winding divided into two parts 8 and 9, which are located at the two sides of the primary winding 4. Two rotary converters 10 and 11 are supplied from the secondaries of the two transformers 1 and 2 and in turn supply the direct-current circuit 12, each converter being provided with a shunt-winding 13 and a series winding 14, the latter serving, in connection with the inductance provided by the transformers, to provide the compounding necessary for the voltage variation in the direct-current circuit 12 which changes of load thereon may make necessary or desirable. As here indicated, the rotary converter 10 is supplied from the secondary winding 6 of the transformer 1, and the corresponding winding 8 of the transformer 2 and the converter 11 is supplied from the winding 7 of the transformer 1 and the corresponding winding 9 of the transformer 2, this arrangement being such that the inductive effect with one of the rotary converters in operation is almost exactly the same as that when both of the converters are in operation. This result depends upon the fact that the impedance volts with a given number and arrangement of coils vary in proportion to the load or to the current in the transformers, the impedance volts of a transformer being defined as the electromotive force necessary to circulate full-load current through the primary winding when the secondary winding is short-circuited. The impedance volts with one rotary converter in operation would be approximately double the impedance volts with two converters in operation if full-load current circulated in the primaries of the transformers; but one rotary converter provides only one-half full load for the transformers, and hence the impedance volts with one rotary in operation are approximately the same in value as with two in operation and the compounding of the rotary converters is approximately the same with either one or two converters in operation when the transformer-coils are arranged as shown and described.

When three rotary converters are operated from a single bank of transformers, each transformer may have its windings arranged as shown in Fig. 2, the primary winding 15 being located in the middle, the same as in the arrangement shown in Fig. 1, and the secondary winding being subdivided, so that the winding 16 for converter No. 1, for example, is located at one side of the primary winding and the winding 17 for converter No. 2 is located at the other side of the primary winding and the winding for converter No. 3 is located on both sides of the primary winding, the two portions 18 and 19 being connected in series with each other, as indicated. It is of course to be understood that another transformer having windings corresponding to those here shown will be used for two-phase operation and that three similar transformers will be used in connection with three-phase currents. With this arrangement it is not possible to obtain exactly the same compounding effect for either one or two converters that is obtained when all three of the converters are in operation; but such condition is much more nearly approximated than is possible with the usual arrangement of coils. This is true because the secondary coils 18 and 19 are more remote from the primary coil 15 than the secondary coils 16 and 17, and consequently the leakage magnetic flux between the coil 15 and coils 18 and 19 is not the same as that between coil 15 and coils 16 and 17. Hence the impedance volts with either one or two rotary converters in operation are not exactly the same as with all three in operation.

In Fig. 3 I have shown a transformer adapted for use in conjunction with other transformers similarly constructed for supplying one, two, three, or four rotary converters, the primary winding 20 being located in the middle, the same as in the forms shown in the preceding figures. The secondary winding 21 for rotary converter No. 1 is located at one side of the primary winding 20, and the winding 22 for rotary converter No. 2 is located similarly at the opposite side of the primary winding. The winding for rotary converter No. 3 is all located at one side of the primary winding, but is divided into two parts 23 and 24, which are respectively located at the opposite sides of the winding 21 and are connected together in series. In the same manner the winding for rotary converter No. 4 is located all at the opposite side of the primary winding 20, but is subdivided into two parts 25 and 26, which are respectively located at the opposite sides of the winding 22 and connected together in series. With this arrangement of windings if only one rotary converter is operated the compounding effect will be approximately one-half that which is obtained when all four converters are in operation. If rotaries No. 1 and No. 2 or rotaries No. 3 and No. 4 are operated at the same time, the compounding effect will be approximately the same as that which is obtained when all of the converters are in operation. If rotary converters No. 1 and No. 3 or converters No. 1 and No. 4 or converters No. 2 and No. 3 or converters No. 2 and No. 4 are operated together, the compounding effect will be approximately one-half that which is obtained when all of the rotaries are in operation. If any three of the rotary converters are operated at the same time, the compounding effect will be less than that obtained when four converters are in operation, but will be more than one-half of such effect.

It will thus be seen that by a proper selection of circuits for the converters which are operated at any one time different degrees of compounding may be secured.

It will be understood from the illustration and foregoing description that the secondary windings of a bank of transformers may be so subdivided and the subdivisions so disposed with reference to each other and to the corresponding primary coils that either a full complement of rotary converters or any less number may be operated therefrom without material variation in the compounding effect or so that less than the full complement of converters will have at least a greater proportion of the total compounding effect than is represented by the ratio of the number of rotary converters in operation to the number which may be operated from that bank of transformers. For example, if two rotary converters provide full load for a bank of transformers it is possible by the arrangement of coils herein described to obtain approximately the same compounding effect with one rotary converter in operation as with two. If the transformers are designed to operate three rotary converters, with the arrangement of coils which I have described the compounding effect with one rotary converter in operation is much greater than a third of the total compounding effect with three in operation and with two rotary converters in operation the compounding effect is much greater than two-thirds of the total compounding effect with three in operation.

The arrangements of windings and circuits shown and described are susceptible of amplification, and I therefore wish it to be understood that the invention is not limited to the specific combinations set forth either as regards the number of secondary circuits or as to the arrangement of such circuits with reference to the primary winding.

I claim as my invention—

1. The combination with a plurality of rotary converters, of a plurality of transformers each of which has at least one secondary winding at each side of its primary winding, and means for connecting each rotary converter with a secondary winding at one side only of the primary winding of each transformer.

2. The combination with a bank of transformers each of which has a plurality of secondary windings, of a rotary converter and means for connecting the same to a secondary winding at one side only of the primary winding of each transformer.

3. The combination with a plurality of rotary converters and means for connecting their direct-current ends in parallel, of a bank of transformers each of which has a plurality of secondary windings and means for connecting each rotary converter to a secondary winding at one side only of the primary winding of each transformer.

4. The combination with a bank of transformers each of which has a plurality of secondary windings that are symmetrically disposed with reference to the primary winding, of a plurality of rotary converters each of which is arranged and adapted for connection to and disconnection from corresponding windings of said transformers at one side only of the respective primary windings.

5. The combination with a plurality of transformers having primary windings supplied with phase-differing currents and each having a plurality of secondary windings, of a plurality of rotary converters corresponding in number to the secondary windings of each transformer and severally adapted for connection to and disconnection from said windings at one side only of the respective primary windings.

6. The combination with a plurality of compound-wound rotary converters adapted for operation in parallel, of a bank of transformers each having a plurality of secondary windings so disposed that the number of rotary converters connected thereto may be varied without materially varying the compounding effect upon the direct-current circuit supplied thereby.

7. A transformer having a plurality of secondary windings adapted to carry corresponding portions of a given full load and having a ratio of inductive effects that exceeds the ratio between corresponding partial load and full load.

8. A transformer having a plurality of secondary windings adapted to carry corresponding portions of a given full load and having ratios of inductance that exceed ratios of corresponding loads.

9. A transformer having a plurality of secondary windings adapted to carry corresponding portions of a given full load and having ratios of inductance that exceed the ratios between corresponding partial loads and full load.

In testimony whereof I have hereunto subscribed my name this 29th day of April, 1903.

JOHN S. PECK.

Witnesses:
R. F. EMERY,
BIRNEY HINES.